United States Patent

[11] 3,588,389

| | | | |
|---|---|---|---|
| [72] | Inventor | Hosei Sato Nishinomiya-shi, Japan | |
| [21] | Appl. No. | 799,780 | |
| [22] | Filed | Feb. 17, 1969 | |
| [45] | Patented | June 28, 1971 | |
| [73] | Assignee | Matsushita Electric Industrial Co., Ltd. Osaka, Japan | |
| [32] | Priority | Feb. 26, 1968 | |
| [33] | | Japan | |
| [31] | | 43/15011 | |

[54] TOASTER
5 Claims, 13 Drawing Figs.

[52] U.S. Cl. ............................................. 191/12.2, 99/385, 242/85, 242/100, D81/17.4
[51] Int. Cl. .................................................. H02g 11/00
[50] Field of Search........................................ 191/12.2, 12.4; 242/85, 86, 96 (Inquired), 100 (X); D81/17.4; D8/220; 99/385 (X)

[56] References Cited
UNITED STATES PATENTS
| 1,682,421 | 8/1928 | Rosenbaum.................. | 191/12.2X |
| 2,244,619 | 6/1941 | Heise et al. .................. | D81/17.4(UX) |

*Primary Examiner*—Arthur L. La Point
*Assistant Examiner*—George H. Libman
*Attorney*—Stevens, Davis, Miller and Mosher ABSTRACT: A bread toaster which has a cord accommodating space formed in a sidewall of a main casing, with cord winding means provided therein, so that a cord may be drawn from said space in a desired length when the toaster is to be used for toasting bread and taken up by the cord winding means after the toaster has been used, whereby handling of the toaster is facilitated.

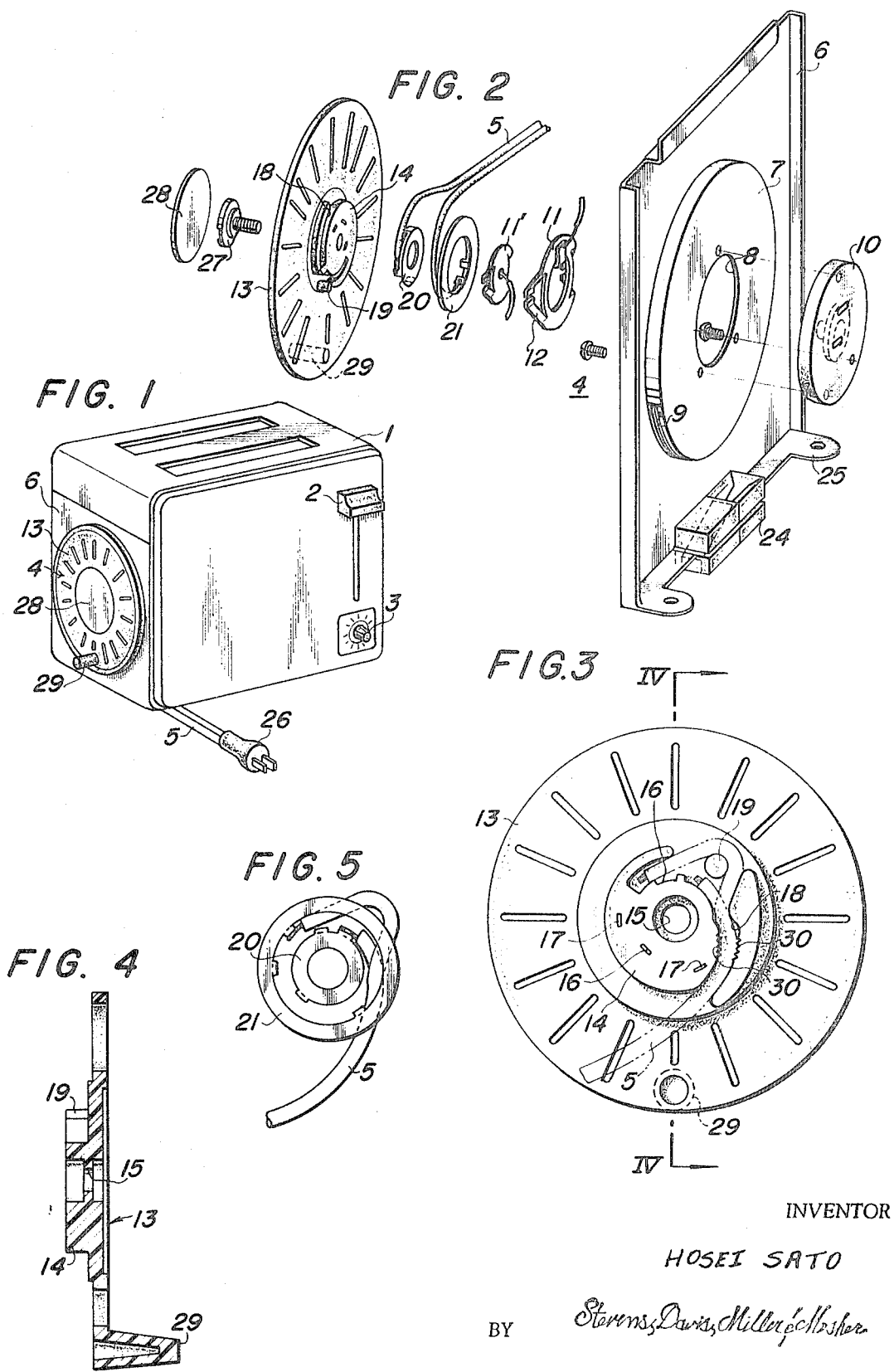

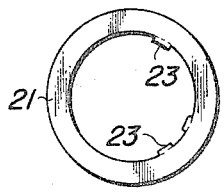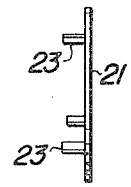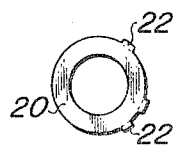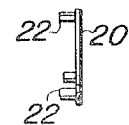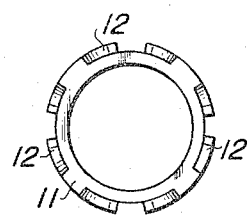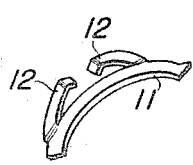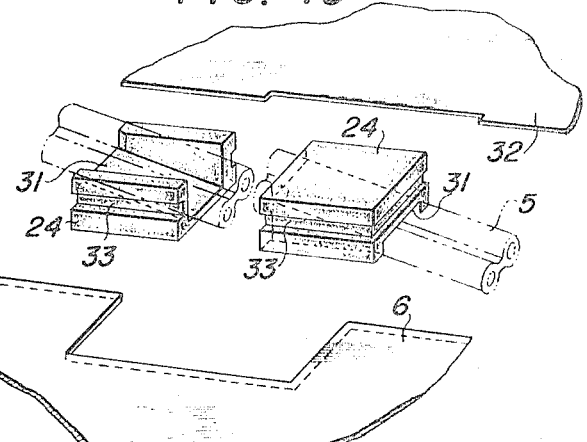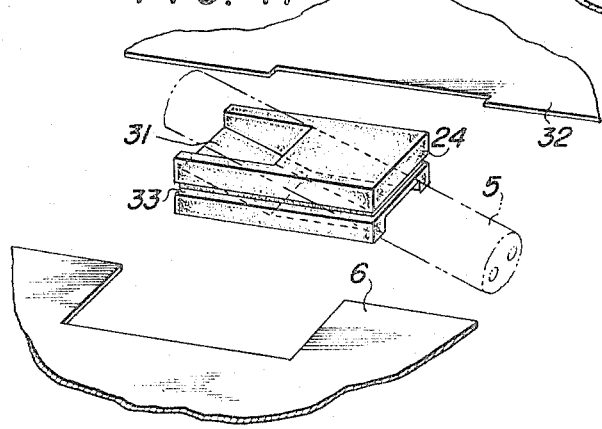
INVENTOR
HOSEI SATO

TOASTER

BACKGROUND OF THE INVENTION

1. FIELD OF THE INVENTION

The present invention relates generally to a bread toaster and more particularly to a toaster equipped with cord winding means.

2. DESCRIPTION OF THE PRIOR ART

Most of the conventional bread toasters are not provided with means for accommodating a power supply cord. Therefore, the cord has been an encumbrance to the user when the toaster is not in use, making the handling of the toaster inconvenient. Some of the prior art toasters are provided with means for accommodating a cord in a bundled state, which includes a cover plate for opening and closing a compartment provided on one side of the toaster. Toasters of this type, however, are only different from the formers in the fact that a cord accommodating compartment is provided, and they have the drawbacks that the cover plate must be opened or closed each time the cord is placed in or removed from the compartment and that since the cord is not always bundled into a compact shape before it is stored in the compartment, a relatively large space is required for the accommodation of the cord and accordingly the entire toaster becomes large in size.

SUMMARY OF THE INVENTION

An object of the present invention is to provide a toaster which comprises a main casing defining a bread toasting chamber and side panels constituting sidewalls of said main casing, one of said side panels having an inwardly recessed portion and a cord leadout part and provided with a cord winding cover disposed in opposed relation to said recessed portion to define a cord accommodating space between it and said side panel, and said side panel and said cord winding cover composing cord winding means.

Another object of the present invention is to provide a novel construction wherein an improvement made in the cord leadout part so as to provide for smooth motion of the cord during extension and retraction of the cord.

Still another object of the present invention is to provide a toaster, the structure of which is simplified by assembling a minimum number of parts organically and which is inexpensive and adapted for domestic use.

According to the present invention, it is possible, due to the provision of the cord winding means, to facilitate the handling of the toaster by maintaining a necessary minimum length of the cord during use of the toaster and storing the cord in the toaster when the toaster is not used, thereby preventing the cord from becoming an obstacle.

It is also possible according to the present invention to select the position of the cord winding means at a side face of the toaster where the temperature is maintained relatively low and thereby to protect the cord from heat generated during the toasting operation.

It is also possible according to the present invention to provide means for winding the cord neatly and to provide a cord reel capable of storing a maximum length of cord within a minimum space.

It is also possible according to the present invention to attain an assured connection of the cord to the toaster, to absorb an unreasonable tension imposed on the cord and to protect the connection between the cord and a collector plate, due to the improved structure of the cord winding means.

Still further, it is possible according to the present invention to make the cord winding state visible from the outside by forming the cord winding cover of a transparent material, whereby easiness in handling and an effective decoration can be accorded to the toaster.

BRIEF DESCRIPTION OF THE DRAWINGS

FIG. 1 is a perspective view of an embodiment of the toaster according to the invention;

FIG. 2 is an exploded perspective view of the cord winding means used in the embodiment shown in FIG. 1;

FIG. 3 is a plan view of the inside face of a cord winding disc used in the present invention;

FIG. 4 is a sectional view of the cord winding disc as sectioned at the line IV–IV shown in FIG. 3;

FIG. 5 is a plan view showing the connection between a cord and a collector element;

FIGS. 6a and 6b are a plan view and a side view of an outer collector member respectively;

FIGS. 7a and 7b are a plan view and a side view of an inner collector member respectively;

FIG. 8 is a plan view of an elastic contactor for engagement with the collector member;

FIG. 9 is a fragmentary perspective view of the elastic contactor member shown in FIG. 8;

FIG. 10 is an exploded perspective view of a cord guiding element mounting portion; and FIG. 11 is an exploded perspective view of another embodiment of the cord guiding element mounting portion.

DESCRIPTION OF THE PREFERRED EMBODIMENT

The present invention will be described in detail hereinafter with reference to the accompanying drawings. Referring to FIG. 1, a toaster according to the invention comprises an outer casing 1, an operating handle 2 located on the front face of the outer casing 1, a toast color adjusting knob 3 also located on the front face of the outer casing 1, cord winding means 4 provided in one sidewall of the outer casing 1 and a cord 5 wound on said cord winding means with one end thereof extending to the outside of the outer casing.

The construction of the cord winding means 4 is shown, in explosion, in FIG. 2. Namely, a side panel 6 of the outer casing 1 has a circular recess 7 formed at the center thereof to provide a space for accommodating a cord. A through-hole 8 is formed centrally of the recessed wall portion 7, while a cord passage slot 9 is formed in the peripheral wall of said recess 7. A contactor supporting member 10 of insulating material, such as a synthetic resin, is fitted to the side panel 6 from the inside in coaxial relation to the through-hole 8 in the recessed wall portion 7. Contactor members 11, 11' each consist of a ring-shaped metal sheet having a suitable number of cut-bent lugs 12 formed along the periphery thereof and are supported on the supporting member 10. A cord winding cover 13 which is formed of transparent synthetic resin is disposed coaxially with the recessed wall portion 7 of the side panel 6 in confronting relation thereto, defining a cord accommodating compartment therebetween. The cord winding cover 13 has radial slits formed therein, has an area to cover the recess 7 and is formed of a synthetic resin or the like material integrally with a boss 14 which is located at the center of the inside face of said cord winding cover for retaining the collector members the cord ends connected to the respective collector members. As best shown in FIG. 3, the boss 14 has an axial hole 15 and is provided with slits 16, 17 for positioning the collector members, a groove 18 for tightly securing the cord end portion therein and a projection 19 for supporting said cord end portion in cooperation with said groove 18. The groove 18 and the projection 19 are provided for the purpose of absorbing an unreasonable tension which will possibly be imposed on the cord 5. The collector members 20, 21, as best shown in FIGS. 6a, 6b, 7a and 7b, are formed in the shape of a ring and provided with engaging legs 22, 23 respectively at portions thereof. The collector members 20, 21 are fitted to the front face of the boss 14 in concentrical relation to each other, with the engaging legs 22, 23 received in the respective slots 16, 17 in said boss. One end portion of the cord 5 is forcibly fitted into the groove 18 of the boss 14 and the core wires thereof are connected to the collector members 20, 21 respectively. A cord guiding element 24 is fitted into a notch formed in a lower flange 25 of the side panel 6, so as to be located below the cord passage slot 9 in the peripheral wall of the recess 7, and by which the other end portion of the cord 5, that end portion of the cord where a power connecting plug 26 is provided, is guided and extended smoothly. The cord winding cover 13 is supported by a pin 27 for rotation relative to the side panel 6, said pin extending through the axial hole of the boss 14 and screw-threaded into the contactor supporting member 10 which is fixed to the side panel 6 by means of screws. The head of the pin 27 is covered with a decorative plate 28 which is attached to the cord winding cover 13. The cord winding cover 13 is provided with an operating handle 29 at a location adjacent to the peripheral edge thereof. The opposite walls of the cord holding groove 18 of the boss 14 are knurled as at 30 in FIG. 3 to more positively secure the end portion of the cord 5.

In assembling the cord winding means described above, the elastic contactor members 11, 11' are mounted on the supporting member 10, while the collector plates 20, 21 are mounted on the boss 14 of the cord winding cover 13, and then the pin 27 is extended through the axial hole of the cord winding cover 13 and screw-threaded into said supporting member 10, whereby the cord winding cover 13 is rotatably supported and the collector plates 20, 21 are held in electrical contact with the respective elastic contactor members 11.

When the toaster of the construction described above is to be used for toasting bread, the cord 5 is drawn from the cord accommodating compartment in a desired length by pulling it, and when the toasting operation has been finished, the cord winding cover 13 is rotated by the operating handle 29, whereby the cord is taken up on the boss 14 successively and thus stored in the cord accommodating compartment in a neat shape. By forming the cord winding cover 13 of a transparent material so that the cord winding state may be visible from the outside, twisting of the cord can be prevented and also the decorative effect of the toaster can be enhanced, with the result that the commercial value of the toaster is increased.

The cord guiding element 24 is formed of a synthetic resin or the like material and has such a configuration as shown in detail in FIGS. 10 or 11. Namely, the cord guiding element 24 shown in FIG. 10 is formed with a sloped groove 31 for guiding the cord therein and grooves 33 in the sidewalls for interlocking engagement with the edges of the side panel 6 and a bottom plate 32 of the outer casing of the toaster. In assembling, the edges of the side panel 6 and the bottom plate 32 are fitted into the grooves 33 of the guiding element 24, thereby to secure the guiding element to the toaster, and then the cord 5 is passed through the sloped groove 31. FIG. 10 exemplifies a cord guiding element which is split into two pieces for the purpose of facilitating insertion of the cord therethrough. In this case, two pieces of the same configuration can be coupled in an inverted position relative to each other. Another form of the cord guiding element is shown in FIG. 11, in which the two pieces of the guiding element show in FIG. 10 are integrated into a unitary piece to facilitate assembling by forming openings at the left side portion of the upper wall and the right side portion of the lower wall in communication with the guide groove 31.

I claim:

1. A toaster comprising a main casing defining a bread toasting chamber, at least one side panel constituting an outer sidewall of the toaster, said side panel having an inwardly recessed portion, a cover plate disposed in opposed relation to said recessed portion to define a space for accommodating an electric cord of the toaster between said cover plate and said recessed portion, said cover plate having a boss at the center portion of the inside face thereof around which said cord is wound, means rotatably supporting said cover plate about the center portion of said recessed portion, and a current transmitting means provided at the central portion of the assembly comprising said side panel and said cover plate to transmit electric power from said cord to a toaster circuit.

2. A toaster according to claim 1, further comprising means in the bottom of said toaster to introduce said cord into said toaster, a supporting member of insulating material disposed at the center portion of said recessed portion, contactor members comprising one part of said current transmitting means mounted on said supporting member and collector members comprising a counter part of said current transmitting means mounted on said boss, said cord being connected to said collector members.

3. A toaster according to claim 1, wherein said boss has groove means for tightly fitting an end portion of said cord therein, said groove means having knurled walls.

4. A toaster according to claim 2, wherein said means for introducing said cord is an opening provided with cord guide means having a sloped passage for passing said cord and a slot provided around said guide means to fit to the edge of said opening.

5. A toaster according to claim 1, wherein said cover plate is made of a transparent material.